United States Patent
Tsubaki et al.

(10) Patent No.: US 12,198,867 B2
(45) Date of Patent: Jan. 14, 2025

(54) METHOD FOR MANUFACTURING ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/222,132

(22) Filed: Jul. 14, 2023

(65) Prior Publication Data

US 2023/0360861 A1   Nov. 9, 2023

Related U.S. Application Data

(63) Continuation of application No. 15/427,722, filed on Feb. 8, 2017, now abandoned, which is a continuation of application No. PCT/JP2015/004192, filed on Aug. 21, 2015.

(30) Foreign Application Priority Data

Aug. 26, 2014   (JP) .................................. 2014-171294

(51) Int. Cl.
*H01G 9/035* (2006.01)
*H01G 9/00* (2006.01)
*H01G 9/028* (2006.01)
*H01G 9/07* (2006.01)

(52) U.S. Cl.
CPC .......... *H01G 9/035* (2013.01); *H01G 9/0032* (2013.01); *H01G 9/028* (2013.01); *H01G 9/07* (2013.01)

(58) Field of Classification Search
CPC ...................................... H01G 9/035
See application file for complete search history.

(56) References Cited

U.S. PATENT DOCUMENTS

| | | |
|---|---|---|
| 2001/0030848 A1 | 10/2001 | Shoji et al. |
| 2002/0149903 A1 | 10/2002 | Shoji et al. |
| 2008/0002334 A1 | 1/2008 | Kakuma et al. |
| 2009/0021894 A1 | 1/2009 | Ning et al. |
| 2011/0171366 A1* | 7/2011 | Ning ....................... H01G 9/028 427/80 |
| 2012/0212880 A1 | 8/2012 | Ishimaru et al. |
| 2013/0059064 A1* | 3/2013 | Majima ................ H01G 9/0036 427/80 |
| 2013/0222978 A1 | 8/2013 | Sugawara et al. |
| 2014/0078645 A1* | 3/2014 | Sugihara .................. H01G 9/15 29/25.03 |
| 2014/0168857 A1 | 6/2014 | Sautter et al. |
| 2015/0279502 A1 | 10/2015 | Yamazaki et al. |
| 2017/0092427 A1 | 3/2017 | Aoyama et al. |
| 2017/0133159 A1 | 5/2017 | Aoyama et al. |
| 2017/0148582 A1 | 5/2017 | Matsuura et al. |
| 2017/0263347 A1 | 9/2017 | Yamazaki et al. |

FOREIGN PATENT DOCUMENTS

| | | |
|---|---|---|
| CN | 102646515 A | 8/2012 |
| CN | 106471593 A | 3/2017 |
| CN | 106663541 A | 5/2017 |
| JP | 2001-358039 | 12/2001 |
| JP | 2008-010657 | 1/2008 |
| JP | 2012-186452 A | 9/2012 |
| JP | 2012-191178 | 10/2012 |
| JP | 2014-067949 A | 4/2014 |
| JP | 2014-082392 A | 5/2014 |
| TW | 201425388 A | 7/2014 |
| WO | 2011/099261 A1 | 8/2011 |
| WO | 2014/061502 A1 | 4/2014 |

OTHER PUBLICATIONS

Toshiyuki Murakami et al.: "Particle Size Effect of PEDOT/PSS on the Electrical Properties of Aluminum Solid Capacitors", Kobunshi Ronbunshu (Japanese Journal of Polymer Science and Technology), vol. 70, No. 6, pp. 268-272 (Jun. 2013).
International Search Report of PCT application No. PCT/JP2015/004192 dated Nov. 2, 2015.
English Translation of Chinese Search Report dated Apr. 27, 2018 for the related Chinese Patent Application No. 201580044595.3.
English Translation of Chinese Search Report dated Dec. 24, 2018 for the related Chinese Patent Application No. 201580044595.3.
Non-Final Office Action issued in U.S. Appl. No. 15/427,722, dated Jun. 1, 2018.
Final Office Action issued in U.S. Appl. No. 15/427,722, dated Jan. 28, 2019.
Non-Final Office Action issued in U.S. Appl. No. 15/427,722, dated Jul. 29, 2019.
Final Office Action issued in U.S. Appl. No. 15/427,722, dated Dec. 27, 2019.
Non-Final Office Action issued in U.S. Appl. No. 15/427,722, dated Jun. 9, 2020.
Final Office Action issued in U.S. Appl. No. 15/427,722, dated Nov. 4, 2020.
Non-Final Office Action issued in U.S. Appl. No. 15/427,722, dated Oct. 31, 2022.
Final Office Action issued in U.S. Appl. No. 15/427,722, dated Mar. 16, 2023.

* cited by examiner

*Primary Examiner* — Austin Murata
(74) *Attorney, Agent, or Firm* — Rimon P.C.

(57) ABSTRACT

A method for manufacturing an electrolytic capacitor of the present disclosure includes first to third steps. In the first step, a capacitor element is prepared that includes an anode body on which a dielectric layer is formed. In the second step, the capacitor element is impregnated with a first treatment solution containing at least a conductive polymer and a first solvent. In the third step, the capacitor element is, after the second step, impregnated with a second treatment solution that contains a polyol compound having 3 or more hydroxyl groups per molecule.

9 Claims, 2 Drawing Sheets ical Field

The present disclosure relates to a method for manufacturing an electrolytic capacitor, and, in more detail, relates to a method for manufacturing an electrolytic capacitor excellent in film restorability of a dielectric layer.

2. Description of the Related Art

Along with digitalization of electronic devices, compactification, large capacity, and low equivalent series resistance (ESR) in a high frequency range have been required of capacitors used in the electronic devices.

Promising candidates as small-sized, large capacity, and low ESR capacitors are electrolytic capacitors including as a cathode material a conductive polymer such as polypyrrole, polythiophene, polyfuran, or polyaniline. Proposed is, for example, an electrolytic capacitor including a dielectric layer-formed anode foil (anode body), and a conductive polymer layer as a cathode material, which is provided on the anode foil.

PTL 1 proposes a method for manufacturing an electrolytic capacitor including a conductive solid layer and an electrolyte solution by impregnating a separator-equipped element with a conductive polymer dispersion to form a conductive solid layer, followed by impregnation with the electrolyte solution.

CITATION LIST

Patent Literature

PTL 1: Unexamined Japanese Patent Publication No. 2008-010657

SUMMARY

Technical Problem

The dielectric layer is formed by a surface treatment of an anode foil, and therefore, essentially has many defects which are likely to cause generation of leakage current. With a method of PTL 1, the film restorability for remedying a defect of the dielectric layer is sometimes inadequate depending on conditions for forming the conductive solid layer including a conductive polymer.

Solution to Problem

An aspect of the present disclosure relates to a method for manufacturing an electrolytic capacitor and includes first to third steps. In the first step, a capacitor element is prepared that includes an anode body on which a dielectric layer is formed. In the second step, the capacitor element is impregnated with a first treatment solution containing at least a conductive polymer and a first solvent. In the third step, the capacitor element is, after the second step, impregnated with a second treatment solution that contains a polyol compound having 3 or more hydroxyl groups per molecule.

Advantageous Effect of Disclosure

According to the present disclosure, there is provided an electrolytic capacitor that is high in film restorability and suppresses leakage current.

DETAILED DESCRIPTION

Hereinafter, an exemplary embodiment of a method for manufacturing an electrolytic capacitor according to the present disclosure is described with appropriate reference to drawings. The exemplary embodiment below, however, is not for limiting the present disclosure.

<<Electrolytic Capacitor>>

Figure 1:
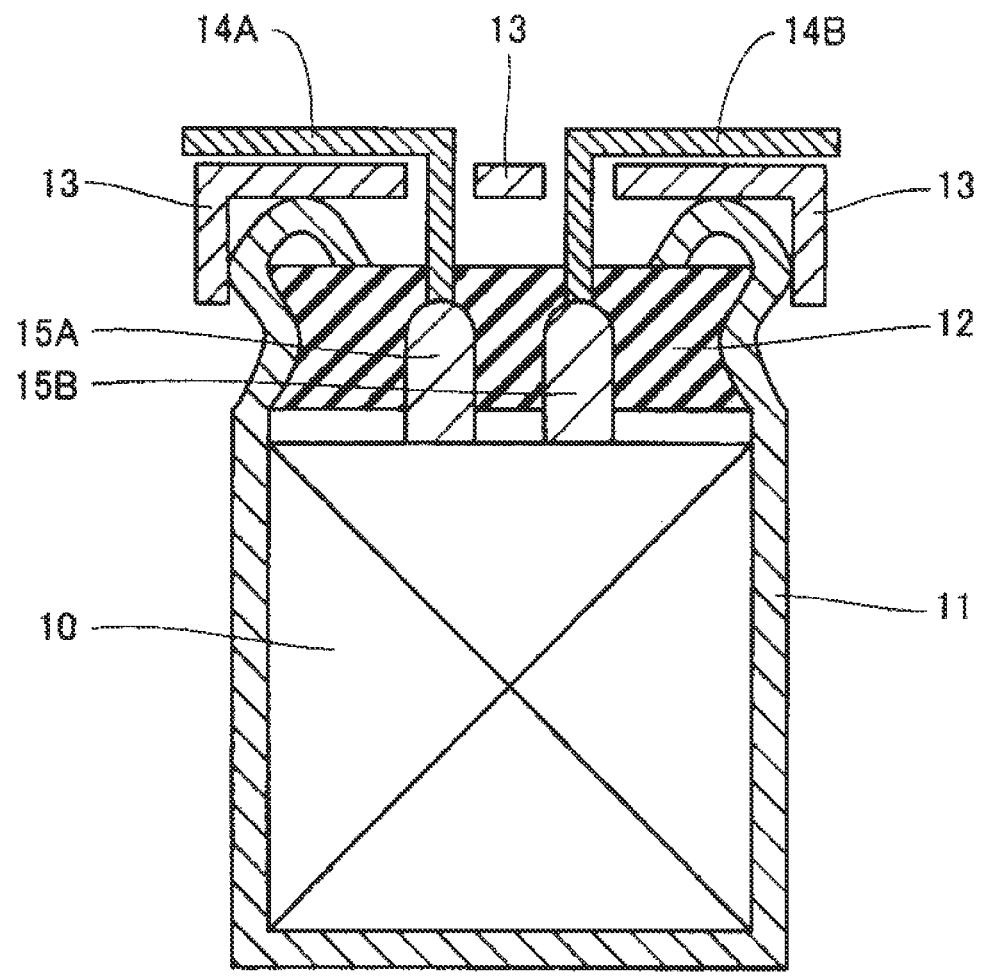
FIG. 1 is a schematic sectional view of an electrolytic capacitor obtained by a manufacturing method according to an exemplary embodiment of the present disclosure.
Figure 2:
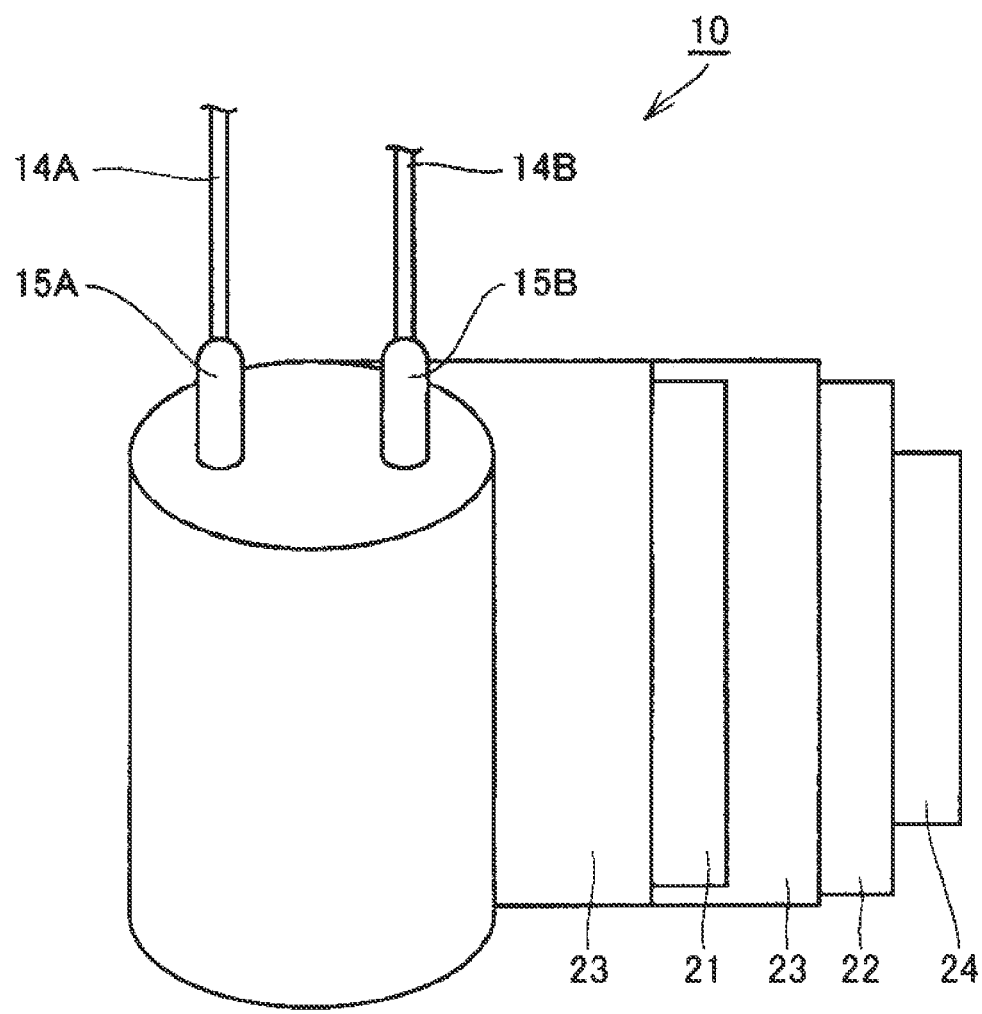
FIG. 2 is a schematic view illustrating a configuration of a capacitor element of the electrolytic capacitor in FIG. 1.

FIG. 1 is a schematic sectional view of an electrolytic capacitor obtained by a manufacturing method according to an exemplary embodiment of the present disclosure. FIG. 2 is a schematic view of a partially developed capacitor element included in the same electrolytic capacitor.

In FIG. 1, the electrolytic capacitor includes capacitor element 10 having anode body 21 on which a dielectric layer is formed; and a conductive polymer (not shown) covering at least a part of a surface (or attached to at least a part of a surface) of the dielectric layer. Capacitor element 10 is housed in an outer case in a state in which at least a part of the surface of the dielectric layer is covered with the conductive polymer. The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, swaged to sealing member 12 for curling.

For example, capacitor element 10 as shown in FIG. 2 is called a wound body. Capacitor element 10 includes anode body 21 connected to lead tab 15A, cathode body 22 connected to lead tab 15b, and separator 23. Anode body 21 and cathode body 22 are wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to include projections and recesses, and a dielectric layer is formed on the metal foil having the projections and recesses.

In the electrolytic capacitor, the conductive polymer is attached so as to cover at least a part of the surface of the dielectric layer formed on anode body 21. The attachment, however, is not limited to this case, and the conductive polymer may be attached to any position between anode body 21 and cathode body 22. For example, the conductive polymer covers at least a part of the surface of the dielectric layer formed on anode body 21, and may further cover at least a part of a surface of cathode body 22 and/or at least a part of a surface of separator 23. In the electrolytic capacitor, the conductive polymer that covers at least a part of the surface of, for example, the anode body, the cathode body, and the separator (specifically, a film including the conductive polymer) is generally referred to as a conductive polymer layer in some cases.

The electrolytic capacitor may further include an electrolyte solution. In this case, the electrolyte solution is housed in the outer case (specifically, bottomed case 11) together with capacitor element 10 in which at least a part of the surface of the dielectric layer is covered with the conductive polymer.

<<Method for Manufacturing Electrolytic Capacitor>>

Hereinafter, an example of the method for manufacturing an electrolytic capacitor according to the exemplary embodiment of the present disclosure is described step by step.

(i) Step of Preparing Capacitor Element 10 (First Step)

(i-1) Step of Preparing Anode Body 21 on which a Dielectric Layer is Formed

First, a raw material of anode body 21, i.e., a metal foil is prepared. A type of the metal is not particularly limited, but it is preferable to use a valve action metal such as aluminum, tantalum, or niobium, or an alloy including a valve action metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to a chemical conversion treatment. The chemical conversion treatment may be performed by, for example, immersing the metal foil in a chemical conversion solution such as an ammonium adipate solution. In the chemical conversion treatment, a voltage may be applied in a state in which the metal foil is immersed in the chemical conversion solution, as necessary.

Normally, a large metal foil formed of, for example, a valve action metal is subjected to a roughening treatment and a chemical conversion treatment from the viewpoint of mass productivity. In this case, the treated foil is cut into a desired size to prepare anode body 21.

(i-2) Step of Preparing Cathode Body 22

A metal foil may also be used for cathode body 22 as with the anode body. A type of the metal is not particularly limited, but it is preferable to use a valve action metal such as aluminum, tantalum, or niobium, or an alloy including a valve action metal. A surface of the metal foil may be roughened as necessary.

Further, on the surface of cathode body 22 may be provided a chemical conversion film, a film of a metal different from the metal that constitutes the cathode body (different type of metal), or a nonmetal film. Examples of the different type of metal and the nonmetal include metals such as titanium and nonmetals such as carbon, respectively.

(i-3) Step of Producing Capacitor Element (Wound Body) 10

Next, capacitor element 10 is produced with anode body 21 and cathode body 22. The capacitor element can be obtained by stacking anode body 21 and cathode body 22 with separator 23 interposed between the anode body and the cathode body. Anode body 21 and cathode body 22 may be wound with the separator interposed between the anode body and the cathode body to form a wound body as shown in FIG. 2. At this time, the winding may be conducted while lead tabs 15A, 15B are rolled in the anode body, the cathode body and the separator, to cause lead tabs 15A, 15B to stand up from the wound body as shown in FIG. 2.

As separator 23, for example, a nonwoven fabric may be used, which includes a fiber of, for example, cellulose, polyethylene terephthalate, a vinylon, or a polyamide (e.g., an aliphatic polyamide and an aromatic polyamide such as aramid).

A material for lead tabs 15A, 15B is not particularly limited as long as the material is a conductive material. Surfaces of lead tabs 15A, 15B may be subjected to a chemical conversion treatment. Further, lead tabs 15A, 15B may be covered with a resin material at a part in contact with sealing member 12 and a part connected to lead wires 14A, 14B.

A material for lead wires 14A, 14B connected to lead tabs 15A, 15B, respectively, is not also particularly limited, and, for example, a conductive material may be used.

Then, fastening tape 24 is disposed on an end of an outer surface of anode body 21, cathode body 22 or separator 23, which is positioned at an outermost layer of the wound body (cathode body 22 in FIG. 2), to fix the end with fastening tape 24. When anode body 21 is prepared by cutting a large metal foil, the capacitor element in a state of, for example, a wound body, may further be subjected to a chemical conversion treatment in order to provide a dielectric layer on a cut surface of anode body 21.

(ii) Step of Impregnating Capacitor Element (Wound Body) 10 with First Treatment Solution (Second Step)

Next, capacitor element 10 is impregnated with a first treatment solution.

Impregnation of capacitor element 10 with the first treatment solution is not particularly limited as long as the first treatment solution can be applied to at least the anode body (particularly, at least the dielectric layer). For example, the capacitor element may be immersed in the first treatment solution, or the first treatment solution may be injected into the capacitor element. The impregnation may be conducted under atmospheric pressure, but may also be conducted in an atmosphere under a reduced pressure ranging, for example, from 10 kPa to 100 kPa, preferably from 40 kPa to 100 kPa. The impregnation may also be conducted under ultrasonic vibration as necessary. An impregnation period depends on a size of capacitor element 10, but ranges, for example, from 1 second to 5 hours, preferably from 1 minute to 30 minutes. By this step, the first treatment solution is applied to capacitor element 10.

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present specification, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methyl-propanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000. A conductive polymer including such a polyanion is easily and uniformly dispersed in a liquid solvent containing a first solvent, facilitating uniform attachment of the conductive polymer to the surface of the dielectric layer.

It is sufficient that the first treatment solution contains at least the conductive polymer and a liquid solvent containing the first solvent. Further, the first treatment solution may be either a solution obtained by dissolving the conductive polymer in a liquid solvent or a dispersion liquid obtained by dispersing the conductive polymer in a liquid solvent. In the dispersion liquid, the conductive polymer is, in a state of particles, dispersed in the liquid solvent. Used as the dispersion liquid may be one obtained by polymerizing, in a liquid solvent, a raw material of the conductive polymer (e.g., a precursor such as a monomer and/or an oligomer of the conductive polymer) in the presence of a dopant to generate particles of the conductive polymer including the dopant. Alternatively, used as the dispersion liquid may also be one obtained by polymerizing, in a liquid solvent, a raw material of the conductive polymer to generate particles of the conductive polymer, or one obtained by dispersing, in a liquid solvent, particles of the conductive polymer synthesized in advance.

It is sufficient that the liquid solvent of the first treatment solution contains at least the first solvent, and the liquid solvent may also contain a solvent other than the first solvent. The liquid solvent contained in the first treatment solution may contain a plurality of different first solvents. The first solvent may account for, for example, 30% by mass or more, preferably 50% by mass or more, more preferably 70% by mass or more of the liquid solvent in the first treatment solution.

The first solvent is not particularly limited, and may be water or a nonaqueous solvent. The nonaqueous solvent is a collective term for liquids except water and liquids containing water, and includes an organic solvent and an ionic liquid. As the first solvent, a polar solvent is especially preferable. The polar solvent may be a protic solvent or an aprotic solvent.

Examples of the protic solvent include alcohols such as methanol, ethanol, propanol, butanol, ethylene glycol (EG), propylene glycol, polyethylene glycol, diethylene glycol monobutyl ether, glycerin, 1-propanol, butanol, and polyglycerin, formaldehyde, and water. Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone (γBL); ethers such as 1,4-dioxane; sulfur-containing compounds such as dimethylsulfoxide and sulfolane; and carbonate compounds such as propylene carbonate.

As the first solvent, a protic solvent is especially preferable. Particularly, the first solvent is preferably water. In this case, handleability of the first treatment solution and dispersibility of the conductive polymer are improved. Further, low-viscosity water can be expected to improve contact between the conductive polymer and a polyol compound in a following third step. When the first solvent is water, water preferably accounts for 50% by mass or more, further preferably 70% by mass or more, particularly preferably 90% by mass or more of the liquid solvent in the first treatment solution.

Particles of the conductive polymer dispersed in the dispersion liquid preferably have a median diameter ranging from 0.01 µm to 0.5 µm in a volume particle size distribution obtained by measurement with a particle diameter measuring apparatus according to dynamic light scattering (hereinafter, simply referred to as a median diameter according to dynamic light scattering). A particle diameter of the conductive polymer can be adjusted by, for example, polymerization conditions and dispersion conditions.

Concentration of the conductive polymer (including a dopant, or a polyanion) in the first treatment solution preferably ranges from 0.5% by mass to 10% by mass. The first treatment solution having such a concentration is suitable for attachment of an appropriate amount of the conductive polymer and is easily impregnated into capacitor element 10 to give advantages for improvement of productivity.

Although a liquid solvent such as the first solvent can be removed as necessary after the second step, it is important to subject the capacitor element (particularly, the anode body), in which at least a part of the liquid solvent remains, to the third step. When a liquid solvent is removed after the second step, the liquid solvent may be removed by vaporization under heating, or may be removed under reduced pressure as necessary. When a liquid solvent is removed after the second step, it is desirable to adjust a removal amount so that a remaining amount of the liquid solvent after the removal is in a range described later.

(iii) Step of Impregnating Capacitor Element with Second Treatment Solution (Third Step)

In a third step, the capacitor element to which the first treatment solution has been applied is impregnated with a second treatment solution containing a polyol compound.

In the capacitor element to be subjected to the third step, the remaining amount of the liquid solvent is preferably 5% by mass or more (e.g., 5% by mass to 100% by mass), more preferably 20% by mass or more (e.g., 20% by mass to 100% by mass) or 50% by mass or more (e.g., 50% by mass to 100% by mass). The remaining amount of the liquid solvent in such ranges allows easy and uniform mixing of the polyol compound with the conductive polymer in the capacitor element in the third step, more facilitating uniform attachment of the conductive polymer to the surface of the dielectric layer.

The remaining amount of the liquid solvent indicates a ratio (% by mass) of a mass of the liquid solvent included in the capacitor element to be subjected to the third step to a mass of the liquid solvent contained in the first treatment solution with which the capacitor element has been impregnated in the second step.

In the third step, it is preferable to impregnate with the second treatment solution the capacitor element (particularly, the anode body) in which at least a part of the first solvent remains. The capacitor element including an anode body in which a liquid solvent remains is significantly high in permeability for the second treatment solution. Therefore, when applied to the capacitor element in such a state, the second treatment solution can permeate the capacitor element to more inside, swelling the conductive polymer inside. Such an effect is easily obtained particularly when the impregnation is conducted in a state in which at least water remains. Therefore, it is preferable to use a liquid solvent containing at least water as the first solvent in the first treatment solution. Use of a liquid solvent containing water as the first solvent increases stability of the first treatment solution, so that use of this liquid solvent is advantageous also from such a viewpoint.

A boiling point of the polyol compound is preferably higher than a boiling point of the first solvent. A difference in the boiling point between the polyol compound and the first solvent may be, for example, 20° C. or more, preferably 50° C. or more.

The polyol compound is not particularly limited as long as the polyol compound has 3 or more hydroxyl groups per molecule, and the polyol compound may be a chain polyol or a polyol having an aliphatic ring and/or an aromatic ring. The aliphatic ring and the aromatic ring may be a hydrocarbon ring or a hetero ring having a hetero atom (e.g., an oxygen atom, a nitrogen atom, and/or a sulfur atom). Further, the polyol may include, for example, a condensed ring of hydrocarbon rings, a condensed ring of a hydrocarbon ring and a hetero ring, or a condensed ring of hetero rings. The second treatment solution may contain at least one polyol compound.

Examples of the chain polyol and the polyol having an aliphatic ring (including an aliphatic hetero ring) (sometimes referred to as an "aliphatic polyol") include glycerins (such as glycerin and polyglycerin), trimethylolpropane, pentaerythritol, sugar alcohols [such as erythritol, xylitol, mannitol, sorbitol, galactitol, lactitol, maltitol, and decomposition products of these sugar alcohols (e.g., sorbitan)], sugars [such as glyceraldehyde, glucose, galactose, mannose, and glycosides from these sugars (e.g., glucosides such as methyl glucoside)], alicyclic polyols (e.g., cycloalkane polyols such as cyclohexanetriol, and cycloalkene polyols such as cyclohexenetriol), and alicyclic compounds having a hydroxyalkyl group (e.g., hydroxycyclohexanedimethanol and cyclohexanetrimethanol). In the polyglycerin, a repeating number of a glycerin unit may range, for example, from 2 to 20, from 2 to 10, or from 2 to 6. As the polyglycerin, for example, diglycerin and triglycerin are also preferable.

Examples of the polyol having an aromatic ring include polyhydroxyarenes (such as pyrogallol, phloroglucinol, hexahydroxybenzene, trihydroxynaphthalene, and tetrahydroxynaphthalene) and hydroxyalkylarenes (such as trihydroxymethylbenzene and hydroxydihydroxymethylbenzene). The hydroxyalkylarene may have 3 or more hydroxyalkyl groups, and may have a hydroxyl group bonded to an arene ring and a hydroxyalkyl group. In the latter case, a number of the hydroxyl groups bonded to the arene ring and the hydroxyl groups in the hydroxyalkyl group is 3 or more in total.

Examples of the hydroxyalkyl group included in the polyol compound include hydroxy C1-10 alkyl groups (or hydroxy C1-6 alkyl groups) such as a hydroxymethyl group and a hydroxyethyl group. The hydroxyalkyl group is not particularly limited in number of the hydroxyl groups and may have, for example, 1 to 6 or 1 to 4 hydroxyl groups.

The polyol compound may have 3 or more, 4 or more, or 5 or more hydroxyl groups per molecule. The polyol compound is not particularly limited in maximum number of the hydroxyl groups per molecule, and may have, for example, 20 or less, 15 or less or 10 or less hydroxyl groups. Any of these minimum and maximum values can be combined. The polyol compound may have, for example, 3 to 20, 3 to 15, or 3 to 10 hydroxyl groups per molecule.

A hydroxyl value of the polyol compound is preferably 100 mgKOH/g or more, more preferably 300 mgKOH/g or more, for example. When the hydroxyl value is such a value, the polyol compound is likely to be present stably between particles of the conductive polymer, improving dispersion stability. Therefore, the film restorability of the dielectric layer can be further increased.

A mass of the polyol compound with which the capacitor element is impregnated preferably ranges from twice to 100 times, further preferably from 3 times to 80 times a mass of the conductive polymer with which the capacitor element has been impregnated. A mass ratio in such ranges facilitates acquisition of an effect of swelling the conductive polymer, further increasing the film restoration effect of the dielectric layer.

The second treatment solution may contain only the polyol compound or may contain the polyol compound, a solvent, and/or an additive. The solvent may contain a second solvent that dissolves the polyol compound, or may contain a second solvent and a solvent other than the second solvent. A content of the polyol compound in the second treatment solution is, for example, 2% by mass or more, preferably 5% by mass or more or 10% by mass or more, and may also be 30% by mass or more or 50% by mass or more.

As the second solvent, a polar solvent is preferable, and examples of the polar solvent include an aprotic solvent in addition to the protic solvents exemplified for the first solvent. Examples of the aprotic solvent include amides, lactones, cyclic ethers, sulfones, and cyclic carbonates among the aprotic solvents exemplified for the first solvent. The second treatment solution may contain at least one second solvent.

Examples of the protic solvent as the second solvent include ones that are not included in the polyol compound. As the protic solvent, preferable are water or protic organic solvents such as alcohols other than glycerins (specifically, an alkanol and a glycol), and glycol monoethers.

Such aprotic solvents and protic solvents are high in affinity for the polyol compound to be uniformly mixed with the polyol compound in the second treatment solution. Therefore, the use of such a second solvent further facilitates permeation of the second treatment solution between particles of the conductive polymer, easily increasing the film restoration effect.

Examples of the solvent other than the second solvent include non-polar solvents (e.g., a hydrocarbon, ethyl acetate, and diethyl ether). It is preferable to add the solvent other than the second solvent within a range in which the second treatment solution forms a uniform phase.

A ratio of the second solvent to an entire solvent contained in the second treatment solution is, for example, 30% by mass or more (e.g., 30% by mass to 100% by mass), and may be 50% by mass to 100% by mass or 70% by mass to 100% by mass. When the second treatment solution contains a plurality of second solvents, it is preferable to set the ratio of a total amount of the plurality of second solvents to the entire solvent contained in the second treatment solution to such ranges.

(iv) Step of Removing Solvent Component (Fourth Step)

After the third step, a solvent component that remains in the capacitor element can be removed in a fourth step. In the fourth step, removal of at least a part of the solvent component is sufficient, or the solvent component may entirely be removed. The removal of the solvent component in the fourth step enables further uniform attachment of the conductive polymer to the surface of the dielectric layer.

The solvent component mentioned herein refers to the liquid solvent contained in the first treatment solution, and the polyol compound, the second solvent, and a solvent other than the second solvent contained in the second treatment solution. Especially, it is preferable to remove at least a part of the first solvent and/or the second solvent (particularly, the first solvent) in the fourth step.

In the fourth step, the solvent component can be removed by vaporization under heating, may be removed under atmospheric pressure, or may be removed under reduced pressure as necessary. A temperature during the removal of the solvent component may be higher than a boiling point of the first solvent (or the second solvent), and less than a boiling point of the polyol compound. The removal of the solvent component may be conducted, for example, by a plurality of stages (e.g., at least two stages) having different temperatures, or while the temperature is raised.

Thus, conductive polymer-attached capacitor element 10 is produced, in which the conductive polymer is attached to a position between anode body 21 and cathode body 22 (particularly, the surface of the dielectric layer). The conductive polymer attached to the surface of the dielectric layer substantially functions as a cathode material.

The conductive polymer is preferably attached so as to cover at least a part of the surface of the dielectric layer. The conductive polymer may be attached not only to the surface of the dielectric layer, but also to the surface of cathode body 22 and/or separator 23. At least one step may be repeated two or more times as necessary, which is selected from the group consisting of the second step (ii) of impregnating with the first treatment solution capacitor element 10 that includes anode body 21 having the dielectric layer; the step (optional step) of removing a liquid solvent (such as the first solvent) after the second step; the third step (iii) of impregnating the capacitor element with the second treatment solution; and the fourth step (iv) (optional step) of removing a solvent component. Steps selected from these steps may be repeated two or more times as a series of steps. For example, after repetition of the second step a plurality of times, another step may be conducted, or the second step, the step of removing a liquid solvent as necessary, and the third step set as a series of steps may be repeated a plurality of times. It is advantageous to repeat at least the first step a plurality of times from the viewpoint of increasing coverage of the conductive polymer on the dielectric layer.

The solvent component may be entirely removed from capacitor element obtained in the third or fourth step. Alternatively, in capacitor element 10 obtained in the third or fourth step, the solvent component may remain. When the solvent component remains, the restoration function of the dielectric layer can be further improved. Further, the remaining solvent component exists between particles of the conductive polymer, facilitating permeation of an electrolyte solution between particles of the conductive polymer when the capacitor element is impregnated with the electrolyte solution in the fifth step. Accordingly, the restoration function of the dielectric layer by the electrolyte solution is easily obtained. With the restoration function of the dielectric layer improved, a short circuit can be effectively suppressed even when a guaranteed lifetime of the electrolytic capacitor is over.

(v) Step of Impregnating Capacitor Element (Wound Body) 10 with Electrolyte Solution (Fifth Step)

Capacitor element 10 can further be impregnated with an electrolyte solution after the third step. The fifth step is not particularly limited as long as the fifth step is conducted after the third step. For example, the fifth step may be conducted consecutively after the third step, or may be conducted after another step (e.g., the fourth step) following the third step. The fifth step is not necessarily needed; however, impregnation with the electrolyte solution can further improve the restoration function of the dielectric layer.

As the electrolyte solution, a nonaqueous solvent may be used, or a solution may also be used, which contains a nonaqueous solvent and an ionic substance (solute) dissolved in the nonaqueous solvent. As the nonaqueous solvent, an organic solvent or an ionic liquid may be used. As the nonaqueous solvent, a high boiling point nonaqueous solvent is desirable, and as the high boiling point nonaqueous solvent, there can be used an ionic liquid and/or a high boiling point organic solvent. A boiling point of the nonaqueous solvent is, for example, higher than 100° C., preferably 150° C. or higher, further preferably 200° C. or higher. Examples of the organic solvent include the organic solvents exemplified for the first solvent in the first treatment solution, and the polyol compound, the second solvent, and other solvents exemplified for the second treatment solution. A single one or two or more in combination of the nonaqueous solvents can be used.

Among the nonaqueous solvents, preferable are an alkylene glycol, polyethylene glycol, glycerins, a lactone, a cyclic sulfone, formaldehyde, ethers, amides, esters and ketones. Especially, polyethylene glycol and/or glycerins are preferable, for example.

As the solute, a salt of an anion and a cation is used, and an organic salt is preferable, in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

A method of impregnation of capacitor element 10 with the electrolyte solution is not particularly limited, and the impregnation can be conducted by a known method. For example, capacitor element 10 may be immersed in the electrolyte solution, or the electrolyte solution may be injected into a container housing capacitor element 10. The impregnation of the capacitor element with the electrolyte solution may be conducted under reduced pressure (e.g., 10 kPa to 100 kPa) as necessary.

(vi) Step of Encapsulating Capacitor Element (Wound Body) 10

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above capacitor element 10 to encapsulate capacitor element 10 in bottomed case 11. It is sufficient that sealing member 12 is an insulating substance. As the insulating substance, an elastic body is preferable, and, for example, high heat resistance silicone rubber, fluororubber, ethylene propylene rubber, chlorosulfonated polyethylene rubber (e.g., Hypalon rubber), butyl rubber or isoprene rubber is especially preferable.

Next, bottomed case 11 is, at a part near an opening end, processed by transverse drawing, and is, at the opening end, swaged to sealing member 12 for curling. Then, base plate 13 is disposed on a curled part of the bottomed case to complete the electrolytic capacitor as shown in FIG. 1. Subsequently, an aging treatment may be performed while a rated voltage is applied.

In the exemplary embodiment described above, a wound electrolytic capacitor has been described. The application range of the present disclosure, however, is not limited to the wound electrolytic capacitor, and the present disclosure can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is specifically described with reference to examples and comparative examples. The present disclosure, however, is not limited to the examples below.

Example 1

A wound electrolytic capacitor (diameter: 6.3 mm, length: 5.8 mm) having a rated voltage of 35 V and a rated electrostatic capacity of 47 μF, as shown in FIG. 1, was produced in the following procedure, and evaluation for the electrolytic capacitor was conducted.
(1) Manufacture of Electrolytic Capacitor
(Preparation of Anode Body Having Dielectric Layer)
A 100-μm-thick aluminum foil was subjected to etching to roughen a surface of the aluminum foil. Then, a dielectric layer was formed on the surface of the aluminum foil by a chemical conversion treatment with an ammonium adipate aqueous solution to prepare an anode body having the dielectric layer.
(Preparation of Cathode Body)
A 50-μm-thick aluminum foil was subjected to etching to roughen a surface of the aluminum foil to prepare a cathode body.
(Production of Capacitor Element (Wound Body))
An anode lead tab and a cathode lead tab were connected to the anode body and the cathode body, respectively, and the anode body and the cathode body were wound with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the produced capacitor element was subjected to a chemical conversion treatment again to form a dielectric layer at a cut end of the anode body. Next, an end of an outer surface of the capacitor element was fixed with a fastening tape.
(Impregnation with First Treatment Solution)
A mixed solution was prepared by dissolving 3,4-ethylene dioxythiophene and dopant polystyrenesulfonic acid in ion-exchanged water (first solvent). Ferric sulfate and sodium persulfate (an oxidant) dissolved in ion-exchanged water were added to the resultant mixed solution while the mixed solution was stirred, to cause a polymerization reaction. After the reaction, the resultant reaction solution was dialyzed to remove unreacted monomers and an excessive oxidant, so that a dispersion liquid (first treatment solution) was obtained, which contained about 5% by mass of poly3,4-ethylene dioxythiophene (PEDOT) doped with polystyrenesulfonic acid.

Then, the capacitor element was impregnated with the resultant first treatment solution for 5 minutes.
(Impregnation with Second Treatment Solution)
Next, the capacitor element was impregnated with a second treatment solution. As the second treatment solution, a mixture was used, which contained glycerin as a polyol compound and water as a second solvent in a mass ratio of 80:20. A mass of glycerin with which the capacitor element was impregnated was 16 times a mass of the conductive polymer with which the capacitor element had been impregnated.

Next, the capacitor element was heated at 150° C. for 20 minutes to remove a solvent component.

Thus, a conductive polymer-attached capacitor element was produced.
(Impregnation with Electrolyte Solution)
Next, the capacitor element was impregnated with an electrolyte solution under reduced pressure. Used as the electrolyte solution was a solution containing γBL and mono(ethyldimethylamine) phthalate (solute) in a mass ratio of 75:25.
(Encapsulation of Capacitor Element)
The electrolyte solution-impregnated capacitor element was housed in an outer case as shown in FIG. 1 and encapsulated to produce an electrolytic capacitor. A total of 300 electrolytic capacitors were produced in the same manner.
(2) Evaluation of Performance
(a) Electrostatic Capacity and ESR Value
Electrostatic capacity (μF) was measured as initial characteristics of the electrolytic capacitor. Specifically, initial electrostatic capacity (μF) at a frequency of 120 Hz was measured for the electrolytic capacitor with an LCR meter for 4-terminal measurement.

An ESR value (mΩ) was also measured as initial characteristics of the electrolytic capacitor. Specifically, the ESR value (mΩ) at a frequency of 100 kHz was measured for the electrolytic capacitor with an LCR meter for 4-terminal measurement.

The initial electrostatic capacity and the ESR value were measured for randomly selected 120 electrolytic capacitors, and average values for the initial electrostatic capacity and the ESR value were calculated, respectively.
(b) Leakage Current
The electrolytic capacitor was connected to a 1 kΩ resistor, and leakage current LC (μA) was measured after a rated voltage of 25 V was applied for 1 minute by a DC power source. The measurement of the leakage current was conducted for randomly selected 120 electrolytic capacitors.

Comparative Example 1

An electrolytic capacitor was produced in the same manner as in Example 1 except that the capacitor element that had been impregnated with the first treatment solution was heated at 150° C. for 30 minutes to completely remove the solvent component, without impregnation with the second treatment solution, and the evaluation of performance was conducted for the resultant electrolytic capacitor.

Example 2

An electrolytic capacitor was produced in the same manner as in Example 1 except that a mixture containing glycerin and the second solvent EG in a mass ratio of 80:20 was used as the second treatment solution, and the evaluation of performance was conducted for the resultant electrolytic capacitor.

Example 3

An electrolytic capacitor was produced in the same manner as in Example 1 except that a mixture containing trimethylolpropane as the polyol compound and water as the second solvent in a mass ratio of 50:50 was used as the second treatment solution, and the evaluation of performance was conducted for the resultant electrolytic capacitor.

Comparative Example 2

An electrolytic capacitor was produced in the same manner as in Example 1 except that only EG was used as the second treatment solution, and the evaluation of performance was conducted for the resultant electrolytic capacitor.

Table 1 shows results of examples and comparative examples. Table 1 also shows constituents of the second treatment solution.

TABLE 1

| | Second treatment solution | | Electrostatic capacity/μF | ESR/ mΩ | LC/ μA |
|---|---|---|---|---|---|
| | Polyol compound | Second solvent | | | |
| Example 1 | Glycerin | Water | 41.8 | 22.3 | 0.75 |
| Example 2 | Glycerin | EG | 42.9 | 21.4 | 0.77 |
| Example 3 | Trimethylolpropane | Water | 41.5 | 24.0 | 0.74 |
| Comparative Example 1 | — | — | 28.1 | 86.8 | 14.57 |
| Comparative Example 2 | — | EG | 38.5 | 71.8 | 2.36 |

As shown in Table 1, the leakage current decreased and the ESR value was low in examples. This is considered to be because the film restorability of the dielectric layer was improved by using the second treatment solution containing a polyol compound having 3 or more hydroxyl groups per molecule in examples. In addition, large electrostatic capacity was obtained in examples. In contrast, the leakage current increased and the ESR value was large in comparative examples. Further, the electrostatic capacity was small in Comparative Example 2.

The effects as in examples were not obtained in comparative examples.

The present disclosure can be used for electrolytic capacitors including a conductive polymer as a cathode material.

What is claimed is:

1. A method for manufacturing an electrolytic capacitor, the method comprising:
   a first step of preparing a capacitor element that includes an anode body on which a dielectric layer is formed;
   a second step of impregnating the capacitor element with a first treatment solution containing at least a conductive polymer and a first solvent; and
   a third step of impregnating, after the second step, the capacitor element with a second treatment solution that contains an aliphatic polyol having 3 or more hydroxyl groups per molecule, wherein:
   the first solvent is a protic solvent, and
   in the third step, the capacitor element is impregnated with the second treatment solution in a state that a remaining amount of the protic solvent is 20% by mass or more in the capacitor element.

2. The method for manufacturing an electrolytic capacitor according to claim 1,
   wherein the aliphatic polyol is at least one selected from the group consisting of glycerin, polyglycerin, trimethylolpropane, erythritol, pentaerythritol, xylitol, and mannitol.

3. The method for manufacturing an electrolytic capacitor according to claim 1,
   wherein the second treatment solution contains a second solvent that dissolves the aliphatic polyol.

4. The method for manufacturing an electrolytic capacitor according to claim 3, the method comprising a fourth step of removing at least a part of the first solvent and/or the second solvent after the third step.

5. The method for manufacturing an electrolytic capacitor according to claim 3,
   wherein the second solvent is at least one selected from the group consisting of water, a monohydric alcohol, a dihydric alcohol, and an aprotic solvent.

6. The method for manufacturing an electrolytic capacitor according to claim 1,
   wherein a content of the aliphatic polyol in the second treatment solution is 2% by mass or more.

7. The method for manufacturing an electrolytic capacitor according to claim 1,
   wherein a mass of the aliphatic polyol with which the capacitor element is impregnated in the third step is twice to 100 times a mass of the conductive polymer with which the capacitor element is impregnated.

8. The method for manufacturing an electrolytic capacitor according to claim 1,
   wherein the protic solvent is water.

9. The method for manufacturing an electrolytic capacitor according to claim 1, the method comprising a fifth step of impregnating the capacitor element with an electrolyte solution after the third step.

* * * * *